(12) United States Patent
Zheng et al.

(10) Patent No.: US 10,329,899 B2
(45) Date of Patent: Jun. 25, 2019

(54) BOREHOLE SHAPE ESTIMATION

(71) Applicant: Halliburton Energy Services, Inc., Houston, TX (US)

(72) Inventors: Yibing Zheng, Houston, TX (US); Taher Kortam, Katy, TX (US); Clint K. Bates, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/071,793

(22) PCT Filed: Aug. 24, 2016

(86) PCT No.: PCT/US2016/048254
§ 371 (c)(1),
(2) Date: Jul. 20, 2018

(87) PCT Pub. No.: WO2018/038712
PCT Pub. Date: Mar. 1, 2018

(65) Prior Publication Data
US 2019/0032475 A1    Jan. 31, 2019

(51) Int. Cl.
*G01V 1/50* (2006.01)
*E21B 47/08* (2012.01)
(Continued)

(52) U.S. Cl.
CPC .......... *E21B 47/082* (2013.01); *E21B 47/022* (2013.01); *E21B 47/08* (2013.01);
(Continued)

(58) Field of Classification Search
CPC .... E21B 47/082; E21B 47/08; E21B 47/0003; G01V 1/50
See application file for complete search history.

(56) References Cited

U.S. PATENT DOCUMENTS

| | | |
|---|---|---|
| 5,737,277 A | 4/1998 | Priest |
| 6,038,513 A | 3/2000 | Varsamis et al. |

(Continued)

FOREIGN PATENT DOCUMENTS

| | | | | |
|---|---|---|---|---|
| GB | 2389907 A | * | 12/2003 | ........... E21B 47/082 |
| WO | WO-2016080977 A1 | | 5/2016 | |

OTHER PUBLICATIONS

International Search Report and Written Opinion for PCT/2016/048254, dated Mar. 20, 2017.
(Continued)

*Primary Examiner* — Ian J Lobo
(74) *Attorney, Agent, or Firm* — Locke Lord LLP; Daniel Nguyen; Judy R. Naamat

(57) ABSTRACT

Method and system of estimating a shape of a borehole include receiving data points associated with a standoff measurement for the borehole, wherein each data point includes a radial distance value and an azimuthal value corresponding to the radial distance value. The method and system determine point-to-point angles for the data points based on at least the azimuthal value associated with each data point, wherein each point-to-point angle spans between two adjacent data points. The method and system select a geometric shape from a plurality of geometric shapes to fit to the data points based on the point-to-point angles, the plurality of geometric shapes including a circle and an ellipse. A shape of the borehole is estimated at a location of the standoff measurement based on the selected geometric shape.

20 Claims, 10 Drawing Sheets

(51) Int. Cl.
    *E21B 47/022*     (2012.01)
    *E21B 47/00*     (2012.01)
    *E21B 7/04*     (2006.01)

(52) U.S. Cl.
    CPC .................. *G01V 1/50* (2013.01); *E21B 7/04* (2013.01); *E21B 47/0003* (2013.01)

(56) References Cited

U.S. PATENT DOCUMENTS

| | | |
|---|---|---|
| 6,065,219 A | 5/2000 | Murphey et al. |
| 6,078,867 A | 6/2000 | Plumb et al. |
| 7,103,982 B2 | 9/2006 | Haugland |
| 7,260,477 B2 | 8/2007 | Haugland |
| 7,295,928 B2 | 11/2007 | Hassan et al. |
| 7,548,817 B2 | 6/2009 | Hassan et al. |
| 7,966,874 B2 | 6/2011 | Hassan et al. |
| 8,190,369 B2 | 5/2012 | Moos et al. |
| 8,985,242 B2 | 3/2015 | Samuel et al. |
| 2003/0114987 A1 | 6/2003 | Edwards et al. |
| 2003/0235114 A1* | 12/2003 | Pabon .................. E21B 47/082 367/27 |
| 2006/0249307 A1 | 11/2006 | Ritter et al. |
| 2010/0154531 A1 | 6/2010 | Han et al. |
| 2013/0030705 A1* | 1/2013 | Pei ........................ E21B 47/082 702/6 |
| 2013/0261974 A1 | 10/2013 | Stewart et al. |

OTHER PUBLICATIONS

Detrick, R., Honnorez, J., Bryan, W. B., Juteau, T., et al., Petrophysical Results From Logging in DSDP Hole 395A, ODP LEG 109, Daniel Moos, Proceedings of the Ocean Drilling Program, Scientific Results, vol. 106/109, 1990.

\* cited by examiner

BOREHOLE SHAPE ESTIMATION

CROSS-REFERENCE TO RELATED APPLICATIONS

This application is a 371 U.S. National Phase of International PCT Patent Application No. PCT/US2016/048254, filed on Aug. 24, 2016, the content of which is expressly incorporated herein by reference in its entirety.

FIELD OF THE INVENTION

The present technology relates to using downhole measurements to estimate a borehole shape and, more particularly, borehole estimation that selects an ellipse or circle fitting.

BACKGROUND OF THE INVENTION

Downhole tools, such as calipers or logging-while-drilling (LWD) sonic tools and other instruments, measure the standoffs or radial distances between a borehole wall and the instrument. Azimuthal measurement devices measure an azimuth or angular distance between a radial axis along which an individual standoff measurement is made and a reference axis, such as north. These measurements can be used to calculate a borehole diameter provided an adequate number of standoff measurements are obtained that are sufficiently distributed azimuthally about a circumference of the borehole. In a typical arrangement, each standoff value and associated azimuth value define a standoff data point and the shape of the borehole can be estimated by fitting a geometric shape, such as an ellipse or a circle, to the data points.

However, when the data points are clustered and not azimuthally well distributed around the borehole, the shape used to fit the standoff data points can be a poor match for the data points, which can lead to inaccurate estimations of the borehole shape.

Thus, conventional methods and systems have generally been considered less than satisfactory for their intended purpose. Accordingly, there is continued interest in the development of improved estimation techniques of a borehole shape.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1A:
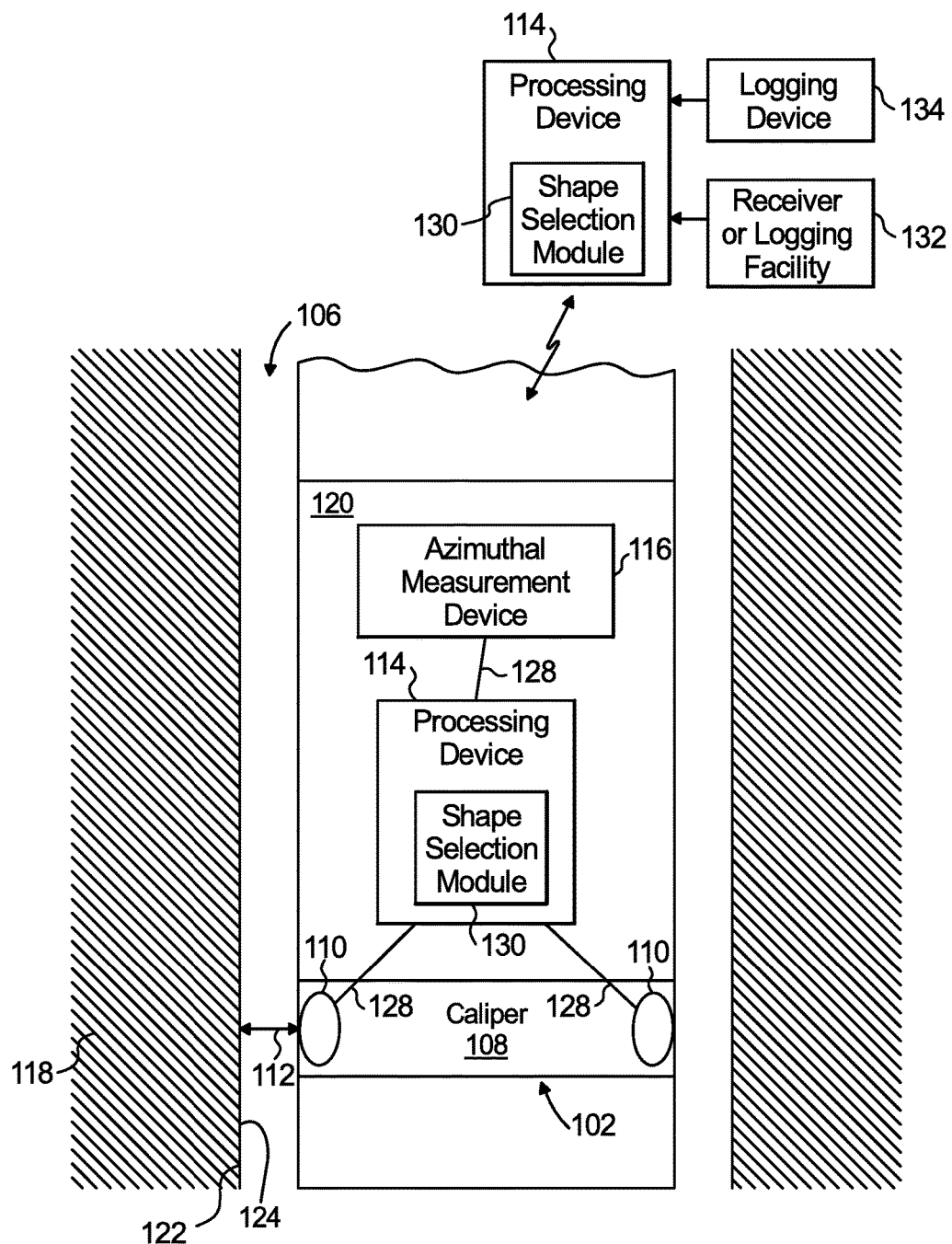
FIG. 1A is a schematic diagram that illustrates an example borehole shape estimation system in accordance with one or more embodiments of the disclosure.

Reference will now be made to the drawings wherein like reference numerals identify similar structural features or aspects of the subject disclosure. For purposes of explanation and illustration, and not limitation, a schematic diagram of an exemplary embodiment of a borehole shape estimation system in accordance with the disclosure is shown in FIG. 1A and is designated generally by reference character 100. Other embodiments of the borehole shape estimation system 100 in accordance with the disclosure, or aspects thereof, are provided in FIGS. 1B-8 as will be described. The systems and methods described herein can be used to provide improved shape selection for fitting to measurement data points associated with borehole shape estimation, for example in borehole drilling or maintenance applications.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1A, a downhole tool 102 in which embodiments of the invention may be implemented is conveyed into a borehole 106 traversing an earth formation 118. A suitable conveyance, which can be or include one or more of any of a drill string, pipe, wireline, slickline, coiled tubing, or a downhole tractor, may be used to convey the downhole tool 102 into the borehole 106. The downhole tool 102 can be used in horizontally, deviated, or vertically oriented portions of the borehole 106. The downhole tool 102 can also be used in conjunction with a variety of operations in both land-based and offshore environments. For example, the downhole tool 102 can be used with logging-while-drilling (LWD) operations or measurement-while-drilling (MWD) operations to provide standoff data for estimating a shape of a bore into which a caliper can be inserted, or it can be used after a drilling operation has been completed, e.g., in a wireline, slickline, or coiled tubing operation.

In the embodiment of FIG. 1A, the downhole tool 102 is provided with a caliper device 108 having a plurality of distance sensors 110 that measure a standoff or radial distance 112, a processing device 114, and an azimuthal measurement device 116. The caliper device 108 is configured to perform two or more sets of standoff measurements per acquisition. Acquisitions are performed once per capture interval. Each standoff measurement set includes standoff data that corresponds to standoff measurements obtained substantially simultaneously by the plurality of sensors 110. The standoff data in turn includes standoff values associated with individual acquisitions. A capture interval can occur periodically, such as at predetermined time intervals, at predetermined length intervals as the caliper 108 is advanced along a length of the borehole 106, and/or in response to a control signal. The control signal can be triggered by, for example, user activation, a sensor output exceeding a predetermined threshold value, or a processing determination, such as by processing device 114.

Examples of calipers that may be used include ultrasound transducers; electromagnetic transducers; mechanical arms and/or fingers, such as with pressure sensors; etc. An example suitable caliper device 108 can include a cylindrical body 120 and sensors 110 disposed on the body 120. The sensors 110 include four ultrasonic transducers (not expressly shown) that are located at about the same distance along the length of the body 120 and evenly spaced about the circumference of the body 120.

The sensors 110 perform standoff measurements by emitting an ultrasonic signal directed at an angle normal to the body 120 towards an inner surface 122 of a borehole wall 124 surrounding the borehole 106. Reflected ultrasonic signals are detected by the sensors 110. The time interval between the emission and detection is measured and output as standoff data that can be used to determine the standoff distance 112 between the sensors 110 and the borehole wall 124. The set of sensors 110 can perform standoff measurements substantially simultaneously as the downhole tool 102 moves within the borehole 106 in a rotational, non-rotational, or translational motion.

In one or more embodiments, standoff data acquisition is performed over the course of a single downhole tool rotation. During the acquisition, multiple standoff measurement sets are acquired. As explained above, each standoff measurement set includes a standoff measurement performed by all of the sensors 110 simultaneously. In an example, four measurement sets are acquired by the sensors 110 simultaneously during an acquisition. For example, in a caliper tool 108 that has four (4) sensors 110 performing four measurement sets per acquisition, the sensors 110 would generate sixteen (16) standoff measurements per acquisition.

In addition, azimuthal data is output by the azimuthal measurement device 116 in association with each standoff measurement. The azimuthal measurement device 116 can be integrated with the downhole tool 102, the processing device 114 (when positioned inside the borehole 106), and/or the caliper 108. The azimuthal data includes azimuthal values that indicate an angle between an axis along which an individual standoff measurement is made and a reference axis (i.e., north). Accordingly, each standoff measurement produces a data point for each sensor 110 having a standoff value that indicates the standoff distance 112 measured by the sensor 110 and an azimuthal value that indicates the azimuthal angle of the sensor's position at the time the standoff distance 112 was measured.

In one or more embodiments, processing device 114 receives standoff data from the sensors 110 and azimuthal data from the azimuthal measurement device 116 and generates a set of data points for each acquisition. In accordance with the disclosed embodiments, the processing device 114 executes a shape selection software module 130 that processes the set of data points associated with the respective acquisition, and selects a geometric shape to fit to the data points. Once the geometric shape (i.e., ellipse, circle, etc.) is selected for a set of data points associated with an acquisition, the shape can be fitted to the data points. This fitted shape may then be used as an estimation of a shape of the borehole 106 at the location where the data points were acquired. The shape of the borehole 106 at different locations along the borehole 106 can thereafter be used to determine and/or monitor characteristics of the borehole 106, such as changes in the borehole's shape, stability of the borehole 106, or volume of the borehole 106.

The determining and/or monitoring can be performed in real time during a drilling operation. This allows the drilling operation to be controlled in real time to cause or prevent changes in the borehole shape as needed in response to the estimated shape of the borehole 106. For example, accurate borehole size and shape can be used to perform environmental correction of LWD sensors, provide real-time assessment of borehole stability, and calculate cement volume for filling the borehole.

The determining and/or monitoring can also be performed after a drilling operation based on the estimated shape of the borehole 106 along the length of the borehole 106. Determinations can be made about available and/or feasible usage and/or treatment of the borehole 106 based on the estimated shape of the borehole 106 along its length. For example, the estimated shape of the borehole 106 along its length can be used to determine a volume of a material to insert in the borehole 106, e.g., to fill and/or reinforce the borehole 106. The estimated shape of the borehole 106 along the length of the borehole 106 can be used to generate a model of the borehole 106, such as for making predictions, e.g., of the borehole's stability over time, and/or determining the need for an intervention, such as changing a characteristic of a drilling fluid, e.g., mud weight or mud type.

In embodiments, processing device 114 and shape selection module 130 can be positioned downhole in the borehole 106 and receive data from sensors 110 and azimuthal measurement device 116 via communication links 128. The communication links 128 can be, for example, wired (e.g., wires and/or traces) and/or wireless (e.g., acoustic, radio frequency, infrared, etc.) communication links. In such embodiments, all of the shape selection processing can be performed in the borehole and the output can be transmitted to one or more other computing devices outside of the borehole 106, e.g., at the surface, such as via telemetry or wireline transmission (described in greater detail below). For example, a receiver or logging facility 132 (described in greater detail below) can receive the telemetry data and transmit the telemetry data to another computing device positioned nearby or at a remote location.

In embodiments, processing device 114 can be positioned outside of the borehole 106, such as at the surface. In such embodiments, the processing device 114 can receive data from the sensors 110 and azimuthal measurement device 116 via telemetry or wireline transmission (see FIG. 1C) and perform the shape selection processing outside of the borehole 106. For example, the sensors 110 and azimuthal measurement device 116 can output standoff data and azimuthal data, respectively, and the data is then transmitted via one or more telemetry devices or wireline transmission devices to the processing device 114.

In embodiments, processing device 114 can include more than one processing device 114, and portions of the shape selection module 130 can be executed by the different processing devices 114. In such embodiments, the different processing devices 114 can be positioned at different locations, which can include locations inside and outside of the borehole 106. The different processing devices 114 can then transmit and/or receive data to and/or from one another, e.g., via wired or wireless communication links, wireline transmission, and/or via the telemetry device(s). One or more of the different processing devices 114 can be positioned, for example, at a location that is remote from the mouth of the borehole 106.

Figure 1B:
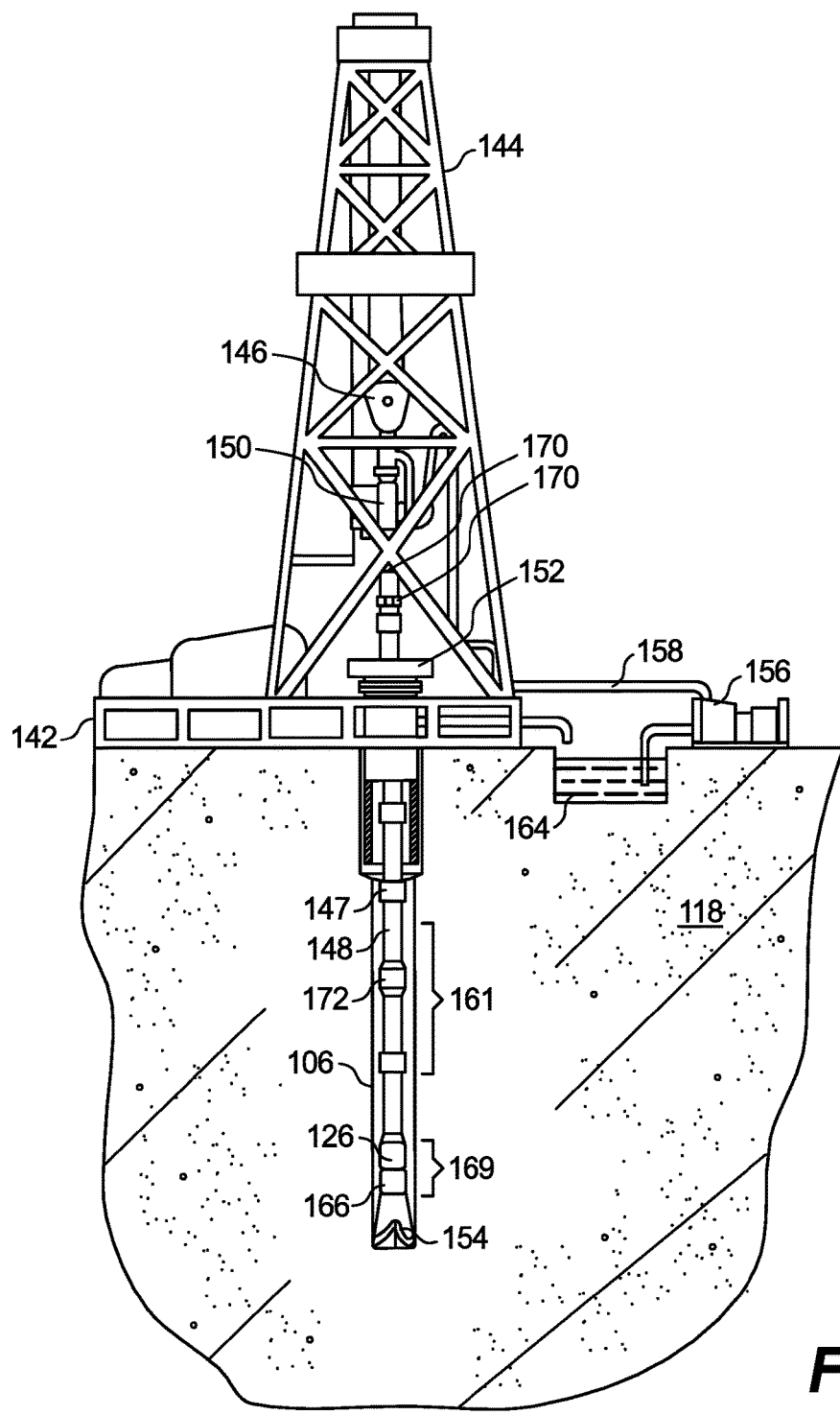
FIG. 1B is a schematic diagram that illustrates an example logging while drilling (LWD) environment.

FIG. 1B shows a logging while drilling (LWD) environment suitable for describing the operation of the disclosed systems and methods. In the illustrated LWD environment, a drilling platform 142 is equipped with a derrick 144 that supports a hoist 146 for raising and lowering a drill string 148. The hoist 146 suspends a top drive 150 that rotates the drill string 148 as it is lowered through a well head 152. The drill string 148 can be extended by temporarily anchoring the drill string 148 at the well head 152 and using the hoist 146 to position and attach new drill pipe sections with threaded connectors 147.

Connected to the lower end of the drill string 148 is a drill bit 154. As bit 154 rotates, it creates a borehole 106 that passes through the formation 118. A pump 156 circulates drilling fluid through a supply pipe 158 to top drive 150, through the interior of drill string 148, through orifices in drill bit 154, back to the surface via an annulus around drill string 148, and into a retention pit 164. The drilling fluid transports cuttings from the borehole 106 into the pit 164 and aids in maintaining the integrity of the borehole 106. Drilling fluid, often referred to in the industry as "mud", is often categorized as either water-based or oil-based, depending on the solvent.

A logging tool 166, which may be the same as or similar to the tool 102 from FIG. 1A, is integrated into a bottomhole assembly 169 near the bit 154. The logging tool 166 may take the form of a drill collar, e.g., a thick-walled tubular that provides weight and rigidity to aid the drilling process. As the bit 154 extends the borehole 106 through the formation 118, the bottomhole assembly 169 collects measurements of the formation 118 (using logging tool 166) as well as measurements of the tool orientation and position, borehole size, drilling fluid resistivity, and various other drilling conditions.

The orientation measurements collected by bottomhole assembly 169 may be obtained using an orientation indicator device mounted thereon (not expressly shown), which may include sensors such as magnetometers, inclinometers, and/or accelerometers, though other sensor types such as gyroscopes may be used. Preferably, the orientation indicator includes a 3-axis fluxgate magnetometer and a 3-axis accelerometer. The combination of those two sensor systems enables the measurement of the rotational ("toolface") angle, borehole inclination angle ("slope"), and compass direction ("azimuth"). In some embodiments, the toolface and borehole inclination angles are calculated from the accelerometer sensor output. The magnetometer sensor outputs are used to calculate the borehole azimuth. The azimuthal measurement device 116 of FIG. 1A can include the magnetometer sensor for generating the azimuthal data. With the toolface, the borehole inclination, and the borehole azimuthal data, logging tools disclosed herein can be used to steer the bit to a desirable bed. Formation dip and strike values can also be determined and used to steer the bit.

Data from the logging tool 166 can be transmitted using various forms of telemetry used in drilling operations. Downhole sensors or downhole processors (e.g., sensors 110, azimuthal measurement device 116, and/or processing device 114 shown in FIG. 1A) can be coupled to a telemetry module 168 that can transmit telemetry signals. These telemetry signals can be transmitted to a receiving device (e.g., receiving device 132 shown in FIG. 1A) at the surface of borehole 106. The receiving device can provide the telemetry signals to one or more computing devices (e.g., processing device 114, shown in FIG. 1A). The transmission of the telemetry signals can also be performed by one or more downhole repeaters or downhole receivers that retransmit the telemetry signals to the receiving device at the surface of the borehole 106.

Examples of the telemetry module 168 can include an acoustic telemetry transmitter that transmits telemetry signals in the form of acoustic vibrations in the tubing wall of drill string 148. The downhole receivers can include, for example, a downhole acoustic telemetry receiver array 170 that is coupled to tubing below the top drive 150 to receive transmitted telemetry signals. Or the downhole repeaters can include one or more repeater modules 172 that can be optionally provided along the drill string 148 to receive and retransmit the telemetry signals. Other telemetry techniques can be employed, including mud pulse telemetry, electromagnetic telemetry, and wired drill pipe telemetry. Many telemetry techniques also offer the ability to transfer commands from the surface to the bottomhole assembly 169, thereby enabling adjustment of the configuration and operating parameters of logging tool 166. In some embodiments, the telemetry module 168 can additionally or alternatively store measurements from the downhole sensors (e.g., sensors 110 or azimuthal measurement device 116 shown in FIG. 1A) or data output by the downhole processor (e.g., processing device 114 shown in FIG. 1A) for later retrieval when the bottomhole assembly 169 returns to the surface.

Figure 1C:
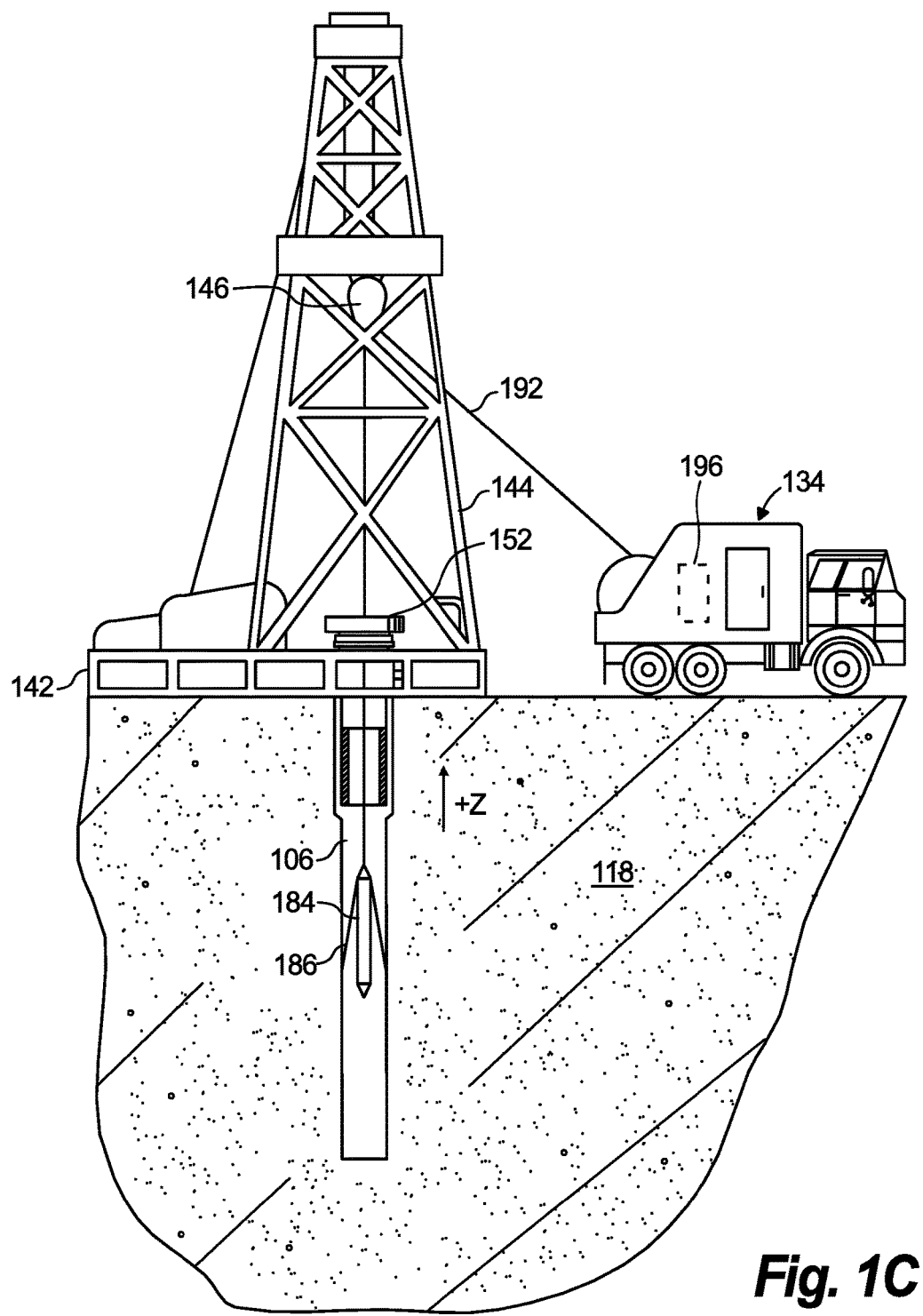
FIG. 1C is a schematic diagram that illustrates an example wireline logging environment.

FIG. 1C shows a wireline logging environment suitable for describing the operation of the disclosed systems and methods. In this example, the drill string 148 shown in FIG. 1B can be removed from the borehole 106 and logging operations can then be conducted using a wireline logging tool 184 in which embodiments disclosed herein may be implemented. Will The wireline logging tool 184 may be, for example, a sonde sensing instrument, suspended by a cable 192. The cable 192 can include conductors for transporting power to the tool 184 and/or communications from the tool 184 to the surface of the borehole 106. A logging portion of the wireline logging tool 184 may have centralizing arms 186 that center the tool 184 within the borehole 106 as the tool 184 is pulled uphole. A logging facility 134 collects measurements from the wireline logging tool 184, and includes computing facilities 196 (e.g., that can include processing device 114 shown in FIG. 1A) for processing and storing the measurements gathered by the wireline logging tool 184.

Figure 2:
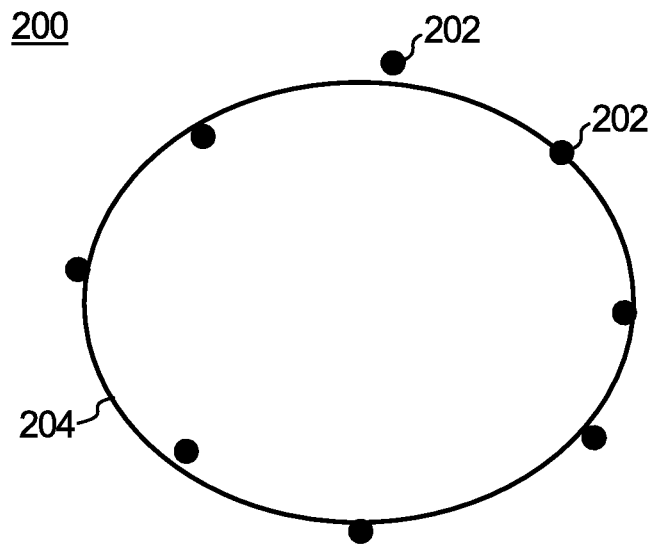
FIG. 2 is a plot of azimuthally distributed data points that illustrates an example of a rationally elongated fitted ellipse.
Figure 3:
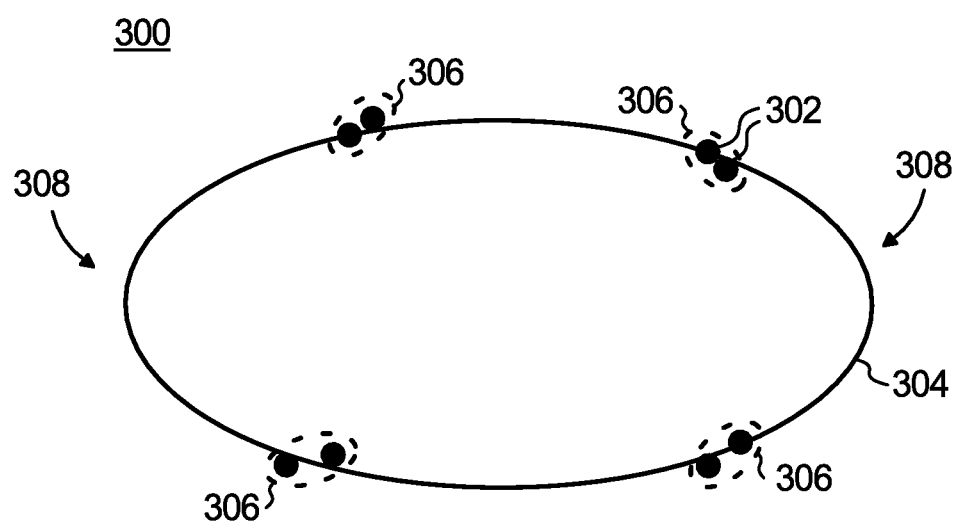
FIG. 3 is a plot of azimuthally clustered data points that illustrates an example of an irrationally elongated fitted ellipse.

FIGS. 2 and 3 illustrate plots 200 and 300 of example data point illustrating how the embodiments disclosed herein may be used to estimate borehole shape. In the examples shown, each data point set includes eight data points that were each generated by four sensors 110, wherein four of the data points correspond to a first measurement set, and the other four data points correspond to a second measurement set. From these data points, a determination may be made regarding whether an ellipse, a circle, or some other circular or ovoid shape should be used as an approximation of the shape of the borehole 106.

Selecting a shape, such as an ellipse, to fit to the data points generally requires at least five azimuthally well distributed data points. Specifically, the minimum of five data points is used to determine several parameters of the ellipse. Examples of the parameters include a center location (x, y), a major axis, a minor axis, and orientation of the major axis. When the data points are clustered and not azimuthally well distributed, the ellipse can have an irrational major-minor axis ratio that increases elongation of the ellipse, resulting in an irrational or exaggerated elongation. Such an elongation can mean that the shape of the ellipse was unduly influenced by, and hence overly sensitive to, inaccuracies of the data points. A circle would be a better shape to fit to such clustered data points.

The above clustering of data points can be caused, for example, when the caliper device 108 on the downhole tool 102 does not rotate or rotates too slowly. This can be, for example, due to a malfunction of a sensor 110 or due to translational movement of the downhole tool 102 without rotation, such as when a wireline is advancing the downhole tool 102 along the length of the borehole 106.

Plot 200 shown in FIG. 2 shows example data points 202 that are azimuthally well distributed. The term "azimuthally well distributed" refers to the data points being more widely distributed around the circumference of the borehole rather than forming closely grouped clusters of data points. Since the data points 202 are azimuthally well distributed, the data points 202 are suitable for being fitted by an ellipse, for example, first ellipse 204. The first ellipse 204 can be fitted to the data points 202 because no distortion of the ellipse is needed to accommodate for clustering due to measurement tolerance related inaccuracies associated with the data points 202.

In contrast, plot 300 shown in FIG. 3 shows example data points 302 that are azimuthally clustered, rather than azimuthally well distributed. As can be seen, while it is possible to fit an ellipse, for example, second ellipse 304, to the data points 302, the data points 302 are not suitable for fitting by an ellipse, as the data points 302 are clustered at mainly four cluster areas 306 (designated by a dotted line). The lack of azimuthally well distributed data points requires the second ellipse 304 to be distorted (i.e., elongated) in order to fit to the data points 302. This causes the second ellipse 304 to include elongated areas 308 that are devoid of data points 302. Thus, rather than fitting an ellipse to the data points 302 shown in FIG. 3, a circle would be a better shape to use in order to minimize any inaccuracies associated with the clustering.

Figure 4A:
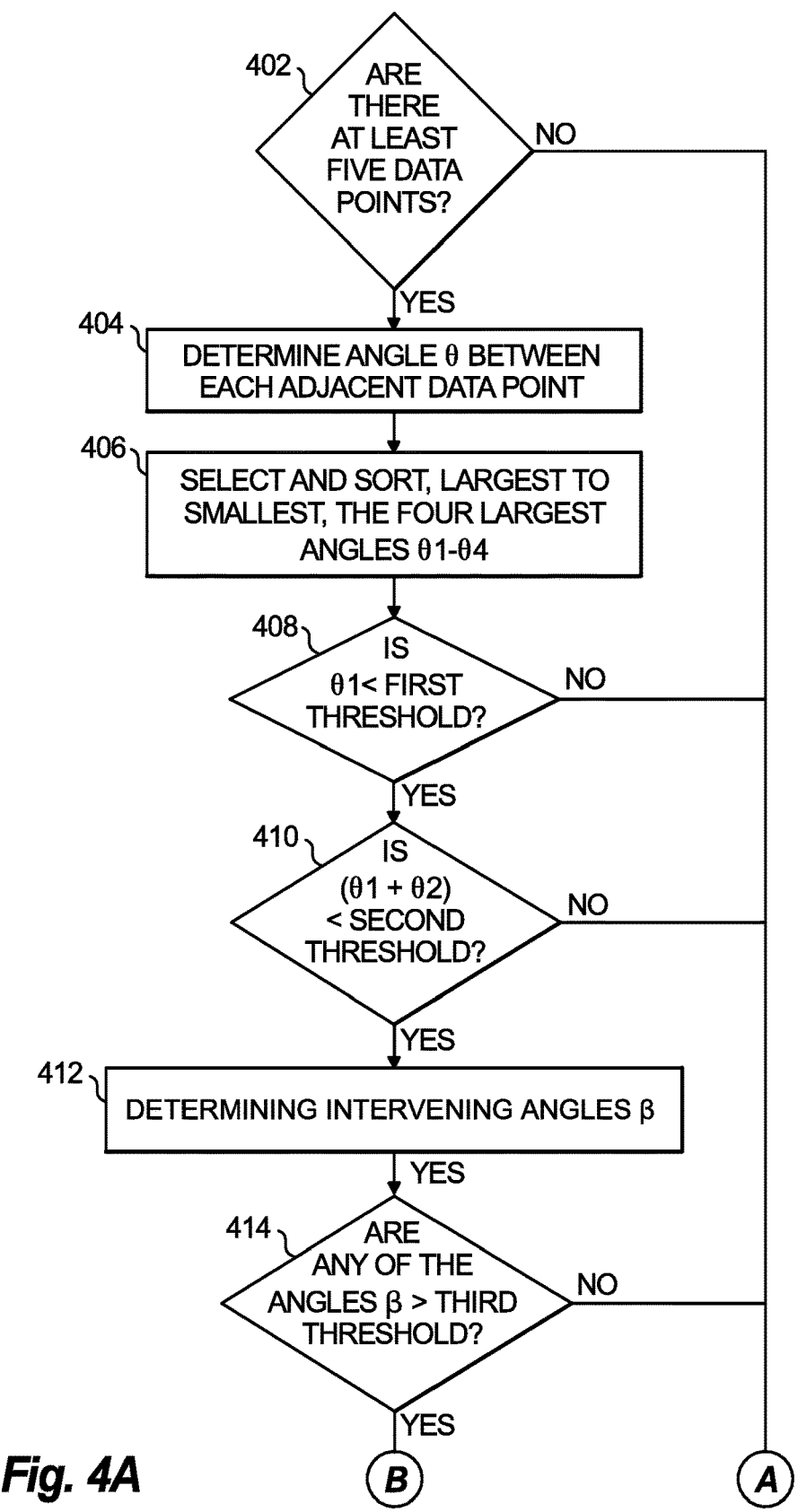
FIGS. 4A-4B are a flowchart that illustrates example operation of a method in accordance with the disclosure.
Figure 4B:
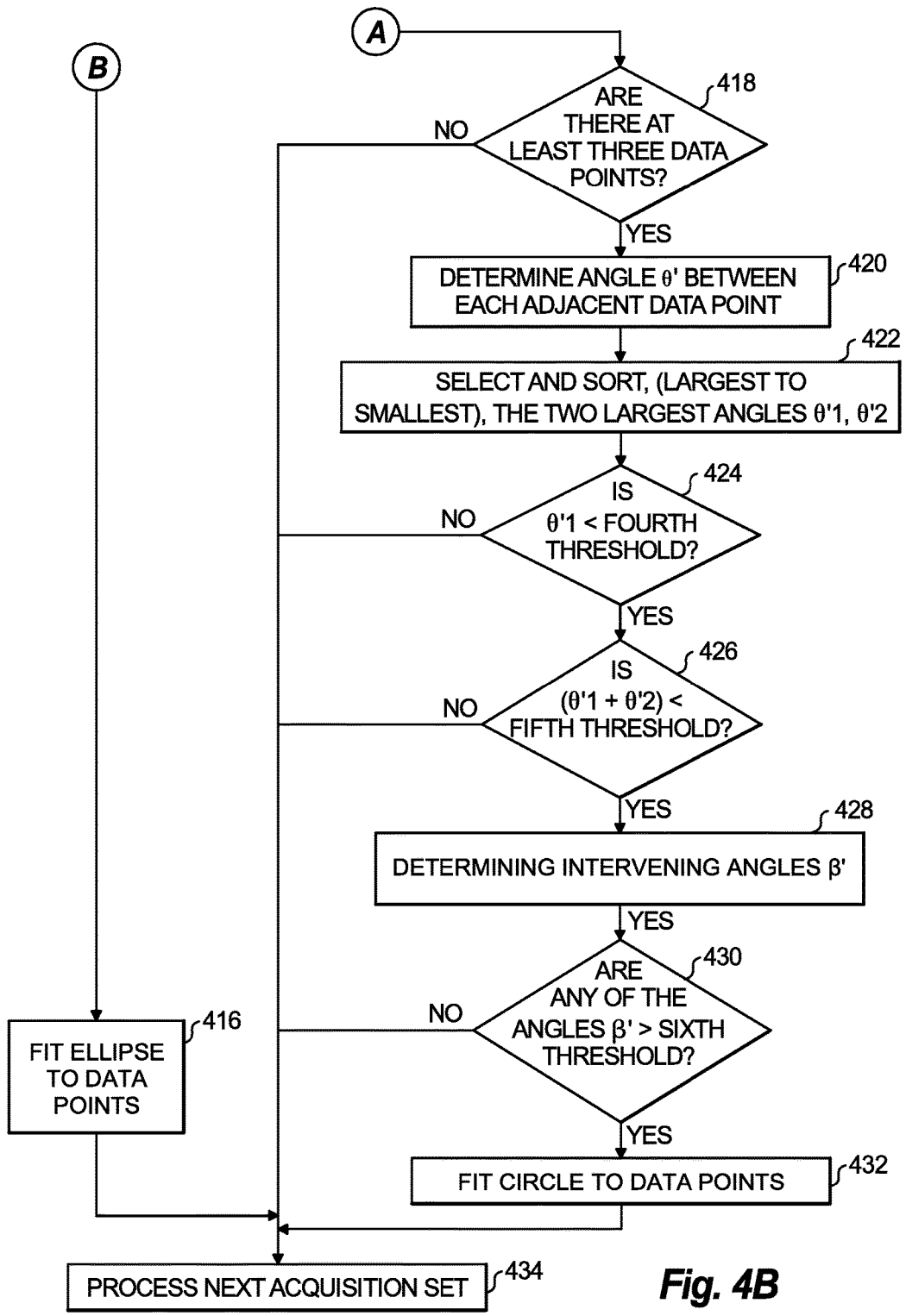

With reference now to FIGS. 4A-4B, a method is shown as a flowchart demonstrating implementation of the various exemplary embodiments. In general, the method applies several criteria to determine whether an ellipse, a circle, or some other geometric shape may be suitable as an estimate of borehole shape for a given set of data points. It is noted that the order of operations shown in FIGS. 4A-4B is not required and the various operations may be performed out of the illustrated order. Also, certain operations may be skipped, different operations may be added or substituted, or selected operations or groups of operations may be performed in a separate application following the embodiments described herein.

The method generally begins at operation 402, where a first criterion for fitting an elliptical shape (e.g., an ellipse) to the data points is applied by determining whether there are at least five data points. If the determination at operation 402 is YES, the first criterion has been satisfied indicating that the data points can be fitted by an ellipse, and the method continues at operation 404. If the determination at operation 402 is NO, the first criterion has not been satisfied, meaning the data points are not good candidates to be fitted by an ellipse, in which case the method continues at operation 418.

At operation 404, an angle referred to herein as angle "θ" for convenience is determined between each pair of adjacent data points. Recall from above that an azimuth is measured and with every standoff data point. These azimuth values may then be used to derive the angles θ. Specifically, each angle θ may be derived by subtracting an azimuth of one data point from an azimuth of an adjacent data point. Each of the angles θ, also called point-to-point angles, is thus defined by two adjacent data points, without any data points between the adjacent data points. More particularly, determining each angle θ, or point-to-point angle, can include arranging the data points in order from 1 to n around the circumference of the borehole based on the azimuth of each data point (e.g., smallest to largest) determined using a magnetic north reference or borehole high side reference (i.e., the upward direction perpendicular to the borehole's axis in the local vertical plane). Thus, the first angle θ is between data points (1, 2), the second angle θ is between data points (2, 3), and so on, with the last angle θ being between data points (n−1, n).

At operation 406, the four largest angles, designated as angles θ1-θ4, are selected and sorted from largest to smallest, with θ1 being the largest. Note that in the current example, the four largest angles are sorted and selected; however, in other embodiments a different number (e.g., five, three, etc.) of largest angles can be sorted and selected.

At operation 408, a second criterion for fitting an ellipse to the data points is applied by determining whether the largest angle θ1 is less than a first threshold. In an example and without limitation, the first threshold is at or about 120 degrees. If the determination at operation 408 is YES, the second criterion has been satisfied, indicating that an ellipse can be fitted to the data points, and the method continues at operation 410. If the determination at operation 408 is NO, the second criterion has not been satisfied, meaning the data points are not good candidates for fitting by an ellipse, and the method continues at operation 418.

At operation 410, a third criterion for using an ellipse to be fitted to the data points is applied by determining whether the sum of the two largest angles, θ1+θ2, is less than a second threshold. Note again that in the current example, the two largest angles θ1 and θ2 are summed, but in other embodiments a different number of largest angles can be summed. In an example and without limitation, the second threshold is at or about 180 degrees, although other angle values can also be used for the second threshold. If the determination at operation 410 is YES, the third criterion has been satisfied indicating that an ellipse can be fitted to the data points, and the method continues at operation 412. If the determination at operation 410 is NO, the third criterion has not been satisfied, meaning the data points are not good candidates for being fitted by an ellipse, in which case the method continues at operation 418.

At operation 412, the remaining point-to-point angles that were not selected as one of the four largest angles θ1-θ4 are used to determine whether an ellipse may be fitted to the data points. Specifically, adjacent ones of the unselected point-to-point angles are combined to form intervening angles, referred to herein as angles "β" for convenience. Each intervening angle β is thus defined as the angle between each pair of adjacent data points making up each of the four largest point-to-point angles θ1-θ4. But unlike the pair of adjacent data points making up each angle θ1-θ4, an intervening angle β may include two, three, or more data points, as there may be multiple data points between any two consecutive angles θ1-θ4. As well, instead of intervening angles β that are between the four largest angles θ1-θ4, a different number of largest angles θ (e.g., three, five, etc.) may be used. In either case, the intervening angles β indicate quality of azimuthal distribution of the data points (i.e., how close or far the data points are to one another around the circumference of the borehole).

At operation 414, a fourth criterion for using an ellipse to fit to the data points is applied by determining whether at least a predetermined number of intervening angles β are greater than a third threshold. In the current example, the fourth criterion is satisfied if at least one of the intervening angles β is greater than the third threshold. In other embodiments, a different number of intervening angles β can be required to be greater than the third threshold. In an example and without limitation, the third threshold is at or about 20 degrees; however, other values can be used for the third threshold.

If the determination at operation 414 is YES, the fourth criterion has been satisfied indicating that the data points can be fitted by an ellipse, and the method continues at operation 416. If the determination at operation 414 is NO, the fourth criterion has not been satisfied, meaning the data points are not good candidates to be fitted by an ellipse, and the method continues at operation 418.

At operation 416, an ellipse is fitted to the data points, for instance, using a conventional algorithm for fitting ellipses to data points, as is known to a person skilled in the art. Examples of algorithms that may be used include least squares fitting (LSF) and Hough-based methods. The method then advances to operation 434 where a next data point set associated with a next standoff measurement acquisition is accessed for processing.

As alluded to above, if the data points are not suitable for an ellipse, the method skips to operation 418 to determine whether another shape, such as a circle, may be used to fit the data points. For the circular shape determination, point-to-point angles and intervening angles are also used, but to avoid potential confusion, these angles are referred to as point-to-point angles θ' and intervening angles β'.

Continuing at operation 418, a fifth criterion, this one used for fitting a circular shape (e.g., a circle) to the data points, is applied by determining whether there are at least three data points. If the determination at operation 418 is YES, the fifth criterion has been satisfied indicating that the data points can be fitted by a circle, and the method continues at operation 420. If the determination at operation 418 is NO, the fifth criterion has not been satisfied, meaning the data points are not good candidates to be fitted by either a circle or an ellipse, in which case the method continues at operation 434 to process the next data point set associated with the next acquisition.

To further determine whether a circle may be used, at operation 420, a point-to-point angle θ' is determined between each adjacent data point. As with the angles θ above, each the of the angles θ' is defined by two adjacent data points, without any data points in between. At operation 422, the two largest point-to-point angles θ'1, θ'2 are selected and sorted from largest to smallest, with θ'1 being the largest. While in the current example the two largest point-to-point angles are sorted and selected, a different number of largest point-to-point angles can be sorted and selected in other embodiments.

At operation 424, a sixth criterion for fitting a circle to the data points is applied by determining whether the largest point-to-point angle, angle θ'1, is less than a fourth threshold. In an example and without limitation, the fourth threshold is at or about 180 degrees, although other values can be used for the fourth threshold. If the determination at operation 424 is YES, the sixth criterion has been satisfied indicating that the data points can be fitted by a circle, and the method continues at operation 426. If the determination at operation 424 is NO, the sixth criterion has not been satisfied, meaning the data points are not good candidates to be fitted by either a circle or an ellipse, in which case the method continues at operation 434 to process the next data point set associated with the next acquisition.

At operation 426, a seventh criterion for fitting a circle to the data points is applied by determining whether the sum of two largest point-to-point angles, θ'1+θ'2, is less than a fifth threshold. In an example and without limitation, the fifth threshold is at or about 270 degrees, although other values can be used for the fifth threshold. If the determination at operation 426 is YES, the criterion has been satisfied, indicating that the data points can be fitted by a circle, and the method continues at operation 428. If the determination at operation 426 is NO, the seventh criterion has not been satisfied, meaning the data points are not candidates to be fitted by either a circle or an ellipse, and the method continues at operation 434 to process the next data point set associated with the next acquisition.

At operation 428, the intervening angles β' that were not selected to be one of the two largest point-to-point angles θ'1, θ'2 are determined. Each intervening angle β' is measured between the two largest point-to-point angles θ'1, θ'2.

At operation 430, an eighth criterion for fitting a circle to the data points is applied by determining whether at least one of the intervening angles β' is greater than a sixth threshold. In the current example, the eighth criterion is satisfied if at least one of the intervening angles β' is greater than the sixth threshold; however, in other embodiments a different number of intervening angles β' can be required to be greater than the sixth threshold. In an example and without limitation, the sixth threshold is at or about 45 degree, although other values can be used for the sixth threshold.

If the determination at operation 430 is YES, the eighth criterion has been satisfied, indicating that the data points can be fitted by a circle, and the method continues at operation 432. If the determination at operation 430 is NO, the eighth criterion has not been satisfied, meaning the data points are not good candidates to be fitted by either a circle or an ellipse, and method thereafter continues at operation 434 to process the next data point set associated with the next acquisition.

At operation 432, a circle is fitted to the data points, for example, using a conventional algorithm for fitting circles to data points, as is known to a person skilled in the art, such as an LSF for circle fitting. The method then advances to operation 434, where a next data point set associated with a next acquisition is accessed for processing.

As can be seen in FIGS. 4A-4B, once it is determined that an ellipse should not be fitted to the data points and the method moves to operation 418, no further attempts are made to determine whether an ellipse should be fitted to the data points until a subsequent set of standoff data points.

Note also that the embodiment in FIGS. 4A-4B require each of the first, second, third, and fourth criterion to be met in order to fit an ellipse to the data points. In other embodiments, once the first criterion is met, any combination of one or more of the second, third, and fourth criteria can be required to fit an ellipse to the data points. Accordingly, the determination whether to fit an ellipse or a circle to the data points is based on at least one of the angles spanning between adjacent data points. Similarly, the embodiment shown in FIGS. 4A-4B requires that each of the fifth, sixth, seventh, and eighth criteria are met in order to fit a circle to the data points. In other embodiments of the disclosure, once the fifth criterion is met, any combination of one or more of the sixth, seventh, and eighth criteria can be required to fit a circle to the data points.

Figure 5:
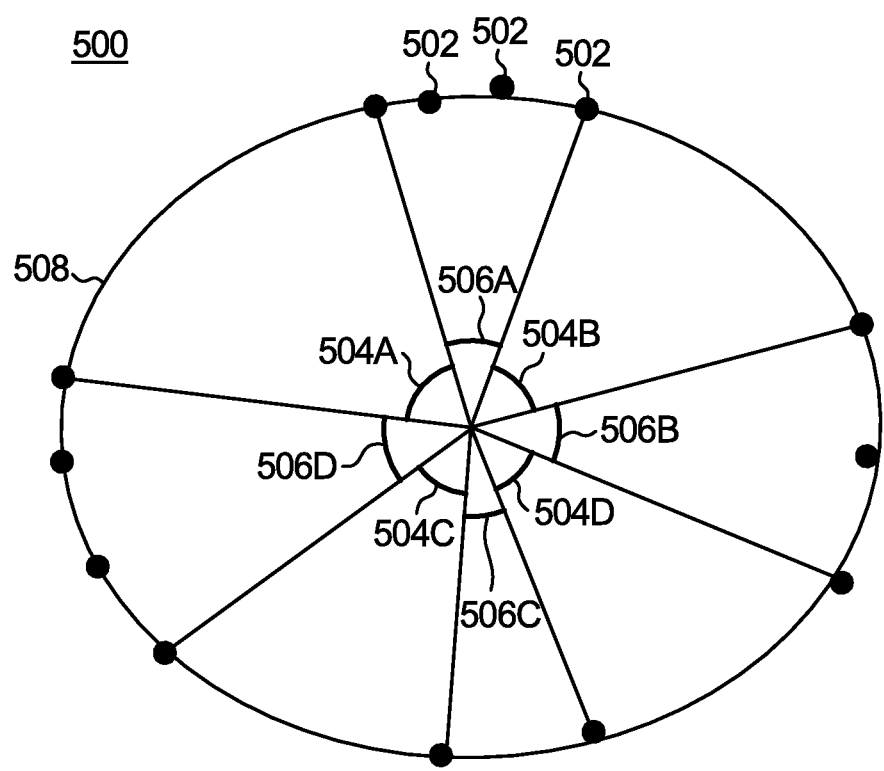
FIG. 5 is a plot of a first set of example data points and example largest point-to-point angles, intervening angles, and fitted ellipse in accordance with the disclosure.

With reference to FIG. 5, a plot 500 is shown of an example set of data points 502 associated with an acquisition. The set of data point 502 includes greater than five data points 502, satisfying the first criterion (e.g., as designated at operation 402). The plotted positions of the data points 502 reflects the standoff and azimuth values associated with each data point 502.

Adjacency of the data points 502 and angles formed between adjacent data points 502 are determined (e.g., in accordance with operation 404). As explained earlier, the angle of every caliper point is measured by an azimuthal sensor reference to magnetic north or the borehole high side. The largest four point-to-point angles 504A-504D (collectively referred to as largest angles 504) are determined and sorted by angle value (e.g., in accordance with operation 406). The largest angle 504A can then be compared to the first threshold (e.g., in accordance with operation 408 and the second criterion).

Intervening angles 506A-506D (collectively referred to as angles 506) are determined (e.g., in accordance with operation 412). Each of the intervening angles 506 spans between adjacent pairs of data points 502 that make up each of the largest point-to-point angles 504. Thus, intervening angle 506A is between largest angles 504A and 504B, intervening angle 506B is between largest angles 504B and 504D, intervening angle 506C is between largest angles 504C and 504D, and intervening angle 506D is between largest angles 504C and 504A.

A determination can be made whether any of the intervening angles 506 exceeds the third threshold (e.g., in accordance with the fourth criterion and operation 408). Based on satisfaction of the first, second, and third criterion, an ellipse 508 is fitted to the data points 502 using an ellipse fitting algorithm (e.g., in accordance with operation 416).

Figure 6:
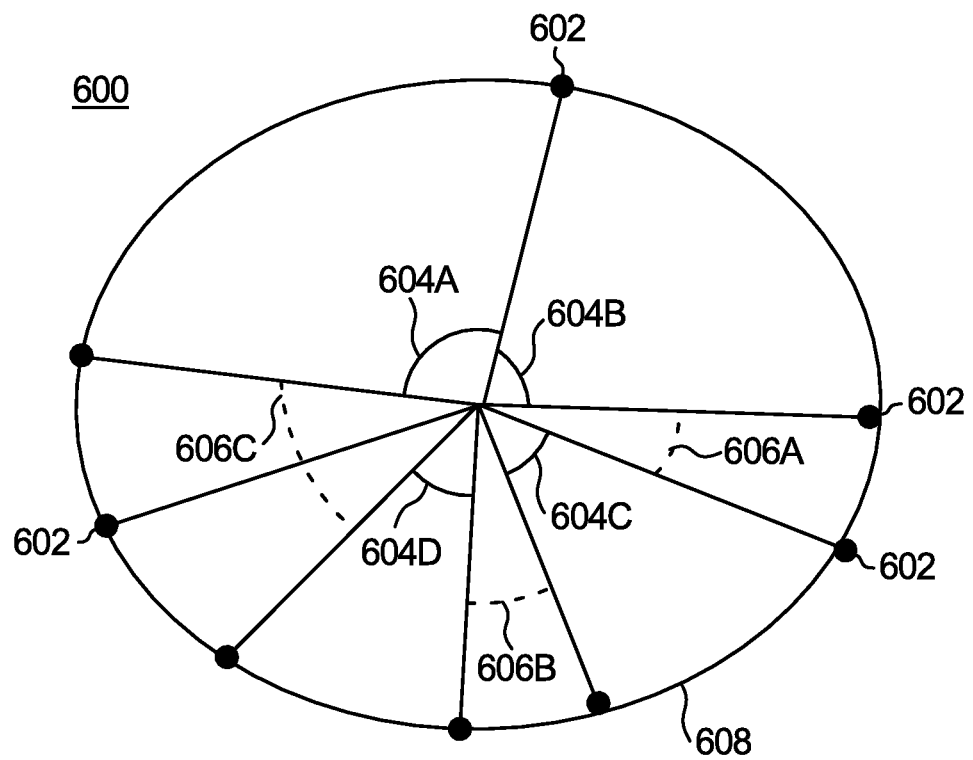
FIG. 6 is a plot of a second set of example data points and example largest point-to-point angles, intervening angles, and fitted ellipse in accordance with the disclosure.

With reference to FIG. 6, a plot 600 is shown of another example set of data points 602 associated with an acquisition, the data points 602 having respective associated angles. The plotted position of the data points 602 is determined using the standoff and azimuth values associated with each data point 602, and the angles are determined (e.g., in accordance with operation 404). A set of largest four point-to-point angles 604A-604D (collectively referred to as largest angles 604) are selected and sorted based on the order of the size of the angle (e.g., in accordance with operation 406). A sum of the angles associated with the largest two angles 604A and 604B can be compared to the second threshold (e.g., in accordance with operation 410).

In this example, intervening angles 606A-606C (collectively referred to as intervening angles 606) that were not determined to be among the largest four angles 604, are determined (e.g., in accordance with operation 412). Each intervening angle 606 is not included with the largest point-to-point angles 604, but is disposed between adjacent pairs of the largest angles 604. Intervening angle 606A is disposed between largest angles 604B and 604C, intervening angle 606B is disposed between largest angles 604C and 604D, and intervening angle 606C is disposed between largest angles 604A and 604D. One of the data points 602 is positioned within the span of intervening angle 606C, and there are not any intervening angles 606 disposed between largest angles 604A and 604B, as they are adjacent to one another. Based on satisfaction of the first, second, and third criterion, an ellipse 608 is fitted to the data points 602 using an ellipse fitting algorithm (e.g., in accordance with operation 416).

Figure 7:
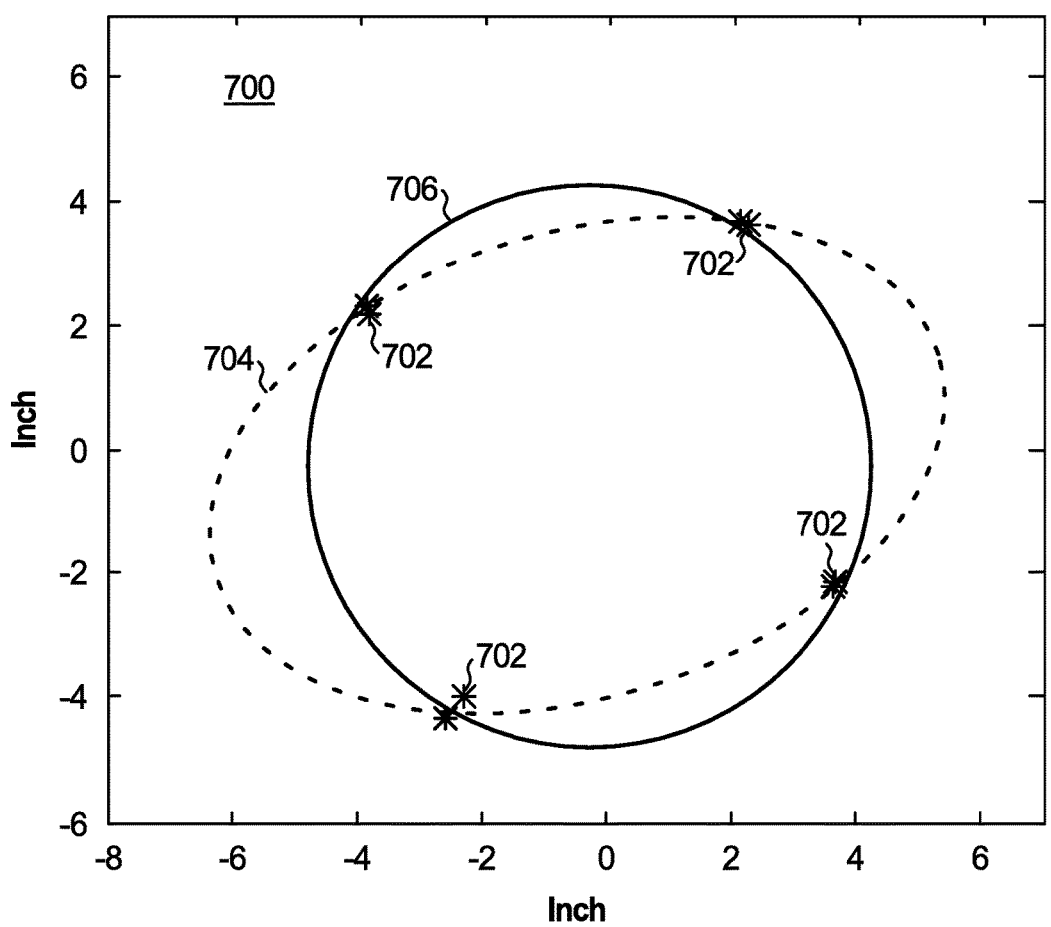
FIG. 7 is a plot of actual data points with a fitted ellipse and a fitted circle.

With reference to FIG. 7, plot 700 is shown with another set of data points 702 for purposes of comparing borehole estimation with and without using the embodiments disclosed herein. The data points 702 in this example are azimuthally clustered in four distinct areas with many of the data points 702 superimposed upon one another. Without the method of the present disclosure, existing solutions may try to fit an ellipse 704 to the data points 702 (e.g., using known ellipse fitting techniques). Since the data points 702 are azimuthally clustered, such a fitted ellipse 704 (shown with a dotted line) would be irrationally elongated. When the method of the disclosure is applied, a determination would be made that an ellipse would be a poor fit for the data points 702, but that a circle would be a better fit for the data points 702. Circle 706 is fitted to the data points 702 for comparison purposes in FIG. 7, such circle 706 providing a reasonably good fit to data points 702.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Accordingly, embodiments of the processing device 114 may be implemented or executed by one or more computer systems. For example, the processing device 114 can be implemented using a computer system such as computer system 802 illustrated in FIG. 8. In various embodiments, computer system 802 may be a server, a mainframe computer system, a workstation, a network computer, a desktop computer, a laptop, downhole tool processor, or the like, and/or include one or more of a field-programmable gate array (FPGA), application specific integrated circuit (ASIC), microcontroller, microprocessor, or the like.

Computer system 802 is only one example of a suitable system and is not intended to suggest any limitation as to the scope of use or functionality of embodiments of the disclosure described herein. Regardless, computer system 802 is capable of being implemented and/or performing any of the functionality set forth hereinabove.

Computer system 802 may be described in the general context of computer system-executable instructions, such as program modules, being executed by a computer system. Generally, program modules may include routines, programs, objects, components, logic, data structures, and so on that perform particular tasks or implement particular abstract data types. Computer system 802 may be practiced in distributed data processing environments where tasks are performed by remote processing devices that are linked through a communications network. In a distributed data processing environment, program modules may be located in both local and remote computer system storage media including memory storage devices.

Figure 8:
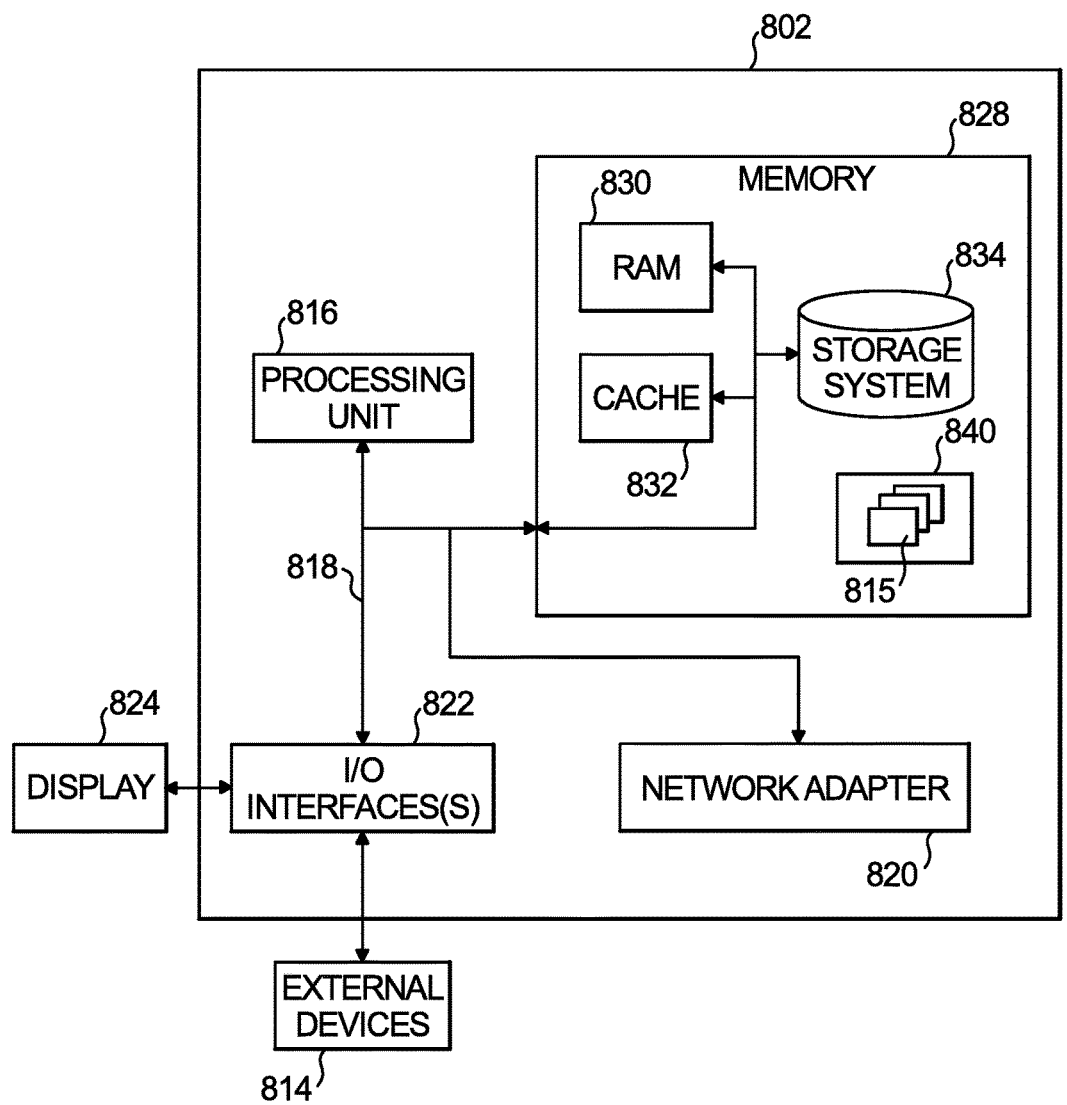
FIG. 8 is a schematic diagram that illustrates internal and external components of an example computing system that implements the borehole shape estimation system in accordance with the disclosure.

Computer system 802 is shown in FIG. 8 in the form of a general-purpose computing device. The components of computer system 802 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 802 typically includes a variety of computer system readable media. Such media may be any available media that is accessible by the computer system 802, and it includes both volatile and non-volatile media, removable and non-removable media.

System memory 828 can include computer system readable media in the form of volatile memory, such as random access memory (RAM) 830 and/or cache memory 832. Computer system 802 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the disclosure.

Program/utility 840, having a set (at least one) of program modules 815, such as computer system 802, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 815 generally carry out the functions and/or methodologies of embodiments of the disclosure as described herein.

Computer system 802 may also communicate with one or more external devices 814 such as a keyboard, a pointing device, a display 824, etc.; one or more devices that enable a user to interact with computer system 802; and/or any devices (e.g., network card, modem, etc.) that enable communication with a network. Such communication can occur via Input/Output (I/O) interfaces 822. Still yet, computer system 802 can communicate with one or more networks such as a local area network (LAN), a general wide area network (WAN), and/or a public network (e.g., the Internet) via network adapter 820. As depicted, network adapter 820 communicates with the other components of computer system 802 via bus 818. It should be understood that although not shown, other hardware and/or software components could be used in conjunction with computer system 802. Examples, include, but are not limited to: microcode, device drivers, redundant processing units, external disk drive arrays, RAID systems, tape drives, and data archival storage systems, etc.

Accordingly, as set forth above, the embodiments disclosed herein may be implemented in a number of ways. For example, in general, in one aspect, the disclosed embodiments relate to a method to estimate a shape of a borehole. The method comprises, among other things, receiving data points associated with a standoff measurement for the borehole, each data point including a radial distance value and an azimuthal value corresponding to the radial distance value. The method also comprises determining point-to-point angles for the data points based on at least the azimuthal value associated with each data point, each point-to-point angle spanning between two adjacent data points. The method further comprises selecting a geometric shape from a plurality of geometric shapes to fit to the data points based on the point-to-point angles, the plurality of geometric shapes including a circle and an ellipse. The shape of the borehole may then be estimated at the location of the standoff measurement based on the selected geometric shape.

In general, in another aspect, the disclosed embodiments relate to a computer system comprising a processor and a memory coupled to the processor. The memory stores programmable instructions, that when executed by the processor, cause the processor to receive data points associated with a standoff measurement for a borehole, each data point including a radial distance value and an azimuthal value corresponding to the radial distance value. The memory also stores programmable instructions, that when executed by the processor, cause the processor to determine point-to-point angles for the data points based on at least the azimuthal value associated with each data point, each point-to-point angle spanning between two adjacent data points. The memory further stores programmable instructions, that when executed by the processor, cause the processor to select a geometric shape from a plurality of geometric shapes to fit to the data points based on the point-to-point angles, the plurality of geometric shapes including a circle and an ellipse. The shape of the borehole may then be estimated at the location of the standoff measurement based on the selected geometric shape.

In accordance with any one or more of the foregoing embodiments, the largest point-to-point angle is determined and a determination is made whether the largest point-to-point angle exceeds a first predetermined threshold. A circle is selected to fit to the data points if the largest point-to-point angle is determined to exceed the first predetermined threshold, and an ellipse is selected to fit to the data points if the largest point-to-point angle is determined to not exceed the first predetermined threshold.

In accordance with any one or more of the foregoing embodiments, a first group of angles is determined having a first predetermined number of largest point-to-point angles and a sum of the point-to-point angles in the first group of angles is determined. A determination is then made whether the sum of the point-to-point angles in the first group of angles exceeds a second predetermined threshold. A circle is selected to fit to the data points if the sum of the point-to-point angles in the first group of angles is determined to exceed the second predetermined threshold, and an ellipse is selected to fit to the data points if the sum of the point-to-point angles in the first group of angles is determined to not exceed the second predetermined threshold.

In accordance with any one or more of the foregoing embodiments, a second group of angles having a second predetermined number of largest point-to-point angles is determined, the second group of angles including at least one of the point-to-point angles in the first group of angles. Intervening angles are then determined for the data points, each intervening angle spanning between two of the point-to-point angles in the second group of angles. A determination is then made whether at least one of the intervening angles exceeds a third predetermined threshold, and a geometric shape is selected from the plurality of geometric shapes based on whether at least one of the intervening angles exceeds the third predetermined threshold.

In accordance with any one or more of the foregoing embodiments, the second predetermined number is four, wherein an ellipse is selected to fit to the data points if it is determined that at least one of the intervening angles exceeds the third predetermined threshold, and an ellipse is selected if it is determined that none of the intervening angles exceeds the third predetermined threshold.

In accordance with any one or more of the foregoing embodiments, first and second sets of data points are received during a drilling operation, the first and second sets of data points being associated first and second locations, respectively, along the borehole. A shape of the borehole is estimated at the first and second locations using the first and second sets of data points, respectively, and the drilling operation is controlled based on the estimated shape of the borehole at the first and second locations along the borehole.

In accordance with any one or more of the foregoing embodiments, first and second sets of data points are received that correspond to first and second locations, respectively, along the borehole. A shape of the borehole at the first and second locations using the first and second sets of data points, respectively, an available usage of the borehole is determined based on the estimated of the shape of the borehole at the first and second locations along the borehole.

In accordance with any one or more of the foregoing embodiments, the radial distance value associated with the standoff measurement is acquired using a sensor operable to measure a radial distance from the sensor to the borehole, and the azimuthal value associated with the standoff measurement is acquired using an azimuthal measuring device operable to measure an azimuth corresponding to the radial distance.

In accordance with any one or more of the foregoing embodiments, the radial distance value and the azimuthal value associated with the standoff measurement are acquired during one of a logging-while-drilling (LWD) operation or a measurement-while-drilling (MWD) operation.

In accordance with any one or more of the foregoing embodiments, the radial distance value and the azimuthal value associated with the standoff measurement are acquired during a wireline operation.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A method to estimate a shape of a borehole comprising:
receiving data points associated with a standoff measurement for the borehole, each data point including a radial distance value and an azimuthal value corresponding to the radial distance value;
determining point-to-point angles for the data points based on at least the azimuthal value associated with each data point, each point-to-point angle spanning between two adjacent data points;
selecting a geometric shape from a plurality of geometric shapes to fit to the data points based on the point-to-point angles, the plurality of geometric shapes including a circle and an ellipse; and
estimating a shape of the borehole at a location of the standoff measurement based on the selected geometric shape.

2. The method of claim 1 further comprising:
determining a largest point-to-point angle;
determining whether the largest point-to-point angle exceeds a first predetermined threshold;
selecting a circle to fit to the data points if the largest point-to-point angle is determined to exceed the first predetermined threshold; and
selecting an ellipse to fit to the data points if the largest point-to-point angle is determined to not exceed the first predetermined threshold.

3. The method of claim 1 further comprising:
determining a first group of angles having a first predetermined number of largest point-to-point angles;
determining a sum of the point-to-point angles in the first group of angles;
determining whether the sum of the point-to-point angles in the first group of angles exceeds a second predetermined threshold;
selecting a circle to fit to the data points if the sum of the point-to-point angles in the first group of angles is determined to exceed the second predetermined threshold; and
selecting an ellipse to fit to the data points if the sum of the point-to-point angles in the first group of angles is determined to not exceed the second predetermined threshold.

4. The method of claim 3 further comprising:
determining a second group of angles having a second predetermined number of largest point-to-point angles, the second group of angles including at least one of the point-to-point angles in the first group of angles;
determining intervening angles for the data points, each intervening angle spanning between two of the point-to-point angles in the second group of angles;
determining whether at least one of the intervening angles exceeds a third predetermined threshold; and
selecting a geometric shape from the plurality of geometric shapes based on whether at least one of the intervening angles exceeds the third predetermined threshold.

5. The method of claim 4 wherein the second predetermined number is four, the method further comprising:
selecting an ellipse to fit to the data points if it is determined that at least one of the intervening angles exceeds the third predetermined threshold; and
selecting a circle to fit to the data points if it is determined that none of the intervening angles exceeds the third predetermined threshold.

6. The method of claim 1 further comprising:
receiving, during a drilling operation associated with the borehole, first and second sets of data points that correspond to first and second locations, respectively, along the borehole;
estimating a shape of the borehole at the first and second locations using the first and second sets of data points, respectively; and
controlling the drilling operation based on the estimated shape of the borehole at the first and second locations along the borehole.

7. The method of claim 1 further comprising:
receiving first and second sets of data points that correspond to first and second locations, respectively, along the borehole;
estimating a shape of the borehole at the first and second locations using the first and second sets of data points, respectively; and
determining an available usage of the borehole based on the estimated of the shape of the borehole at the first and second locations along the borehole.

8. The method of claim 1 further comprising:
acquiring the radial distance value associated with the standoff measurement using a sensor operable to measure a radial distance from the sensor to the borehole; and
acquiring the azimuthal value associated with the standoff measurement using an azimuthal measuring device operable to measure an azimuth corresponding to the radial distance.

9. The method of claim 8, wherein the radial distance value and the azimuthal value associated with the standoff measurement are acquired during one of a logging-while-drilling (LWD) operation or a measurement-while-drilling (MWD) operation.

10. The method of claim 8, wherein the radial distance value and the azimuthal value associated with the standoff measurement are acquired during a wireline operation.

11. A computer system comprising:
a processor:
a memory coupled to the processor, wherein the memory stores programmable instructions, that when executed by the processor, cause the processor to:
receive data points associated with a standoff measurement for a borehole, each data point including a radial distance value and an azimuthal value corresponding to the radial distance value;
determine point-to-point angles for the data points based on at least the azimuthal value associated with each data point, each point-to-point angle spanning between two adjacent data points;
select a geometric shape from a plurality of geometric shapes to fit to the data points based on the point-to-point angles, the plurality of geometric shapes including a circle and an ellipse; and
estimate a shape of the borehole at a location of the standoff measurement based on the selected geometric shape.

12. The computer system of claim 11 wherein the programmable instructions, when executed by the processor, further cause the processor to:
    determine a largest point-to-point angle;
    determine whether the largest point-to-point angle exceeds a first predetermined threshold;
    select a circle to fit to the data points if the largest point-to-point angle is determined to exceed the first predetermined threshold; and
    select an ellipse to fit to the data points if the largest point-to-point angle is determined to not exceed the first predetermined threshold.

13. The computer system of claim 11 wherein the programmable instructions, when executed by the processor, further cause the processor to:
    determine a first group of angles having a first predetermined number of largest point-to-point angles;
    determine a sum of the point-to-point angles in the first group of angles;
    determine whether the sum of the point-to-point angles in the first group of angles exceeds a second predetermined threshold;
    select a circle to fit to the data points if the sum of the point-to-point angles in the first group of angles is determined to exceed the second predetermined threshold; and
    select an ellipse to fit to the data points if the sum of the point-to-point angles in the first group of angles is determined to not exceed the second predetermined threshold.

14. The computer system of claim 13 wherein the programmable instructions, when executed by the processor, further cause the processor to:
    determine a second group of angles having a second predetermined number of largest point-to-point angles, the second group of angles including at least one of the point-to-point angles in the first group of angles;
    determine intervening angles for the data points, each intervening angle spanning between two of the point-to-point angles in the second group of angles;
    determine whether at least one of the intervening angles exceeds a third predetermined threshold; and
    select a geometric shape from the plurality of geometric shapes based on whether at least one of the intervening angles exceeds the third predetermined threshold.

15. The computer system of claim 14 wherein the second predetermined number is four, and the programmable instructions, when executed by the processor, further cause the processor to:
    select an ellipse to fit to the data points if it is determined that at least one of the intervening angles exceeds the third predetermined threshold; and
    select a circle to fit to the data points if it is determined that none of the intervening angles exceeds the third predetermined threshold.

16. The computer system of any one of claim 11, wherein:
    the radial distance value associated with the standoff measurement is acquired using a sensor operable to measure a radial distance from the sensor to the borehole,
    the azimuthal value associated with the standoff measurement is acquired by an azimuthal measuring device, and
    the sensor and the azimuthal measuring device are positioned within the borehole.

17. The computer system of claim 16, wherein the radial distance value and the azimuthal value associated with the standoff measurement are acquired during one of a logging-while-drilling (LWD) operation or a measurement-while-drilling (MWD) operation.

18. The computer system of claim 16, wherein the radial distance value and the azimuthal value associated with the standoff measurement are acquired during a wireline operation.

19. A non-transitory computer-readable medium storing instructions that, when executed by a processor, cause the processor to:
    receive data points associated with a standoff measurement for a borehole, each data point including a radial distance value and an azimuthal value corresponding to the radial distance value;
    determine point-to-point angles for the data points based on at least the azimuthal value associated with each data point, each point-to-point angle spanning between two adjacent data points;
    select a geometric shape from a plurality of geometric shapes to fit to the data points based on the point-to-point angles, the plurality of geometric shapes including a circle and an ellipse; and
    estimate a shape of the borehole at a location of the standoff measurement based on the selected geometric shape.

20. The non-transitory computer readable medium of claim 19 wherein the instructions, when executed by the processor, further cause the processor to:
    determine a largest point-to-point angle;
    determine whether the largest point-to-point angle exceeds a first predetermined threshold;
    select a circle to fit to the data points if the largest point-to-point angle is determined to exceed the first predetermined threshold; and
    select an ellipse to fit to the data points if the largest point-to-point angle is determined to not exceed the first predetermined threshold.

* * * * *